United States Patent
Scheuring et al.

(10) Patent No.: US 11,840,874 B2
(45) Date of Patent: Dec. 12, 2023

(54) COUNTERBALANCE MECHANISM WITH FRICTION

(71) Applicant: MAGNA CLOSURES INC., Newmarket (CA)

(72) Inventors: Joseph Scheuring, Richmond Hill (CA); Wieslaw Nowicki, Mississauga (CA)

(73) Assignee: Magna Closures Inc., Newmarket (CA)

( * ) Notice: Subject to any disclaimer, the term of this patent is extended or adjusted under 35 U.S.C. 154(b) by 574 days.

(21) Appl. No.: 16/830,731

(22) Filed: Mar. 26, 2020

(65) Prior Publication Data

US 2020/0308889 A1    Oct. 1, 2020

Related U.S. Application Data

(60) Provisional application No. 62/824,659, filed on Mar. 27, 2019.

(51) Int. Cl.
*F16F 13/00* (2006.01)
*E05F 3/16* (2006.01)
(Continued)

(52) U.S. Cl.
CPC ............... *E05F 3/16* (2013.01); *E05F 3/18* (2013.01); *F16F 13/007* (2013.01); *B60J 5/10* (2013.01);
(Continued)

(58) Field of Classification Search
CPC ............... F16F 13/007; F16F 2236/103; F16F 2236/106; E05F 3/16; E05F 1/1058
See application file for complete search history.

(56) References Cited

U.S. PATENT DOCUMENTS 3,555,591 A * 1/1971 Sogoian ............ E05F 3/16 16/49
4,423,535 A * 1/1984 Ojima ............ F16F 7/09 16/85
(Continued)

FOREIGN PATENT DOCUMENTS

CN    1448607 A    10/2003
CN    1891964 A    1/2007
(Continued)

*Primary Examiner* — Xuan Lan Nguyen (57) ABSTRACT

A friction based counterbalance mechanism for coupling with a closure panel of a vehicle to assist in opening and closing of the closure panel, the counterbalance mechanism including: a first housing having a first pivot connection mount for connecting to one of a body of the vehicle and the closure panel; an extension member coupled to the first housing at one end and being extendable and retractable with respect to a second housing coupled adjacent to the first housing along an axis, the second housing for connecting by a second pivot connection mount to the other of the body and the closure panel; a sliding friction mechanism having: a shaped sleeve mounted on an exterior surface of the extension member, the shaped sleeve providing an exterior friction surface; and a resilient friction element mounted to the second housing in a fixed location on the axis, the resilient friction element positioned between second housing and the shaped sleeve and biased into contact with the exterior friction surface; wherein relative movement between the shaped sleeve and the resilient friction element as the extension member is displaced generates sliding friction between the resilient friction element and the shaped sleeve.

20 Claims, 10 Drawing Sheets

(51) Int. Cl.
*E05F 3/18* (2006.01)
*B60J 5/10* (2006.01)
*E05F 1/10* (2006.01)

(52) U.S. Cl.
CPC ......... *E05F 1/1058* (2013.01); *E05Y 2201/26* (2013.01); *E05Y 2201/264* (2013.01); *E05Y 2201/266* (2013.01); *E05Y 2201/488* (2013.01); *E05Y 2900/546* (2013.01); *F16F 2236/103* (2013.01); *F16F 2236/106* (2013.01)

(56) References Cited

U.S. PATENT DOCUMENTS

| | | | | |
|---|---|---|---|---|
| 5,727,286 A * | 3/1998 | Shen | ............... | F16F 9/0218 |
| | | | | 16/49 |
| 5,944,376 A * | 8/1999 | Buchanan, Jr. | ....... | E05F 15/622 |
| | | | | 296/100.1 |
| 7,320,198 B2 * | 1/2008 | Berklich, Jr. | ......... | E05F 15/622 |
| | | | | 49/343 |
| 7,648,189 B2 * | 1/2010 | Porat | ................ | E05F 1/1091 |
| | | | | 49/343 |
| 9,840,863 B2 * | 12/2017 | Ruby, III | ................ | E05F 5/08 |
| 2006/0043763 A1 * | 3/2006 | Berklich | ............... | E05F 15/622 |
| | | | | 296/146.4 |
| 2009/0051171 A1 | 2/2009 | Yamamuro | | |
| 2016/0069117 A1 | 3/2016 | Leonard et al. | | |
| 2016/0312514 A1 * | 10/2016 | Leonard | ............. | F16H 25/2454 |
| 2019/0211605 A1 | 7/2019 | Scheuring et al. | | |

FOREIGN PATENT DOCUMENTS

| | | |
|---|---|---|
| CN | 106795929 A | 5/2017 |
| DE | 4442547 C1 | 6/1996 |
| WO | 2018141446 A1 | 8/2018 |

* cited by examiner

COUNTERBALANCE MECHANISM WITH FRICTION

CROSS-REFERENCE TO RELATED APPLICATION

This application claims priority from the benefit of the filing date of U.S. Provisional Patent Application No. 62/824,659 filed on Mar. 27, 2019, entitled "COUNTERBALANCE MECHANISM WITH FRICTION", the contents of which are herein incorporated by reference.

FIELD

This disclosure relates to a friction based counterbalance mechanism for a closure panel.

BACKGROUND

Some vehicles are equipped with a closure panel, such as a lift gate, which is driven between an open position (position 2) and a closed position (position 1) using an electric drive system. Hold systems have been proposed to provide such vehicles with the capability of assisting the operator of the closure panel, in order to maintain a third position hold (or position 2) during opening and closing operations, so as to help counteract the weight of the closure panel itself. Without these hold systems, the closure panel may sag back down at the top end of the operational opening range due to the closure panel weight providing a closure torque greater than an opening torque provided by the electric drive system. Also recognized is a need to provide an extension mechanism that can be used to provide appropriate friction to the open/close operation of the closure panel.

Further disadvantages of current hold systems include bulky form factors which take up valuable vehicle cargo space, requirement to have additional lift support systems in tandem such as gas struts and other counterbalance mechanisms, unacceptable impact on manual open and close efforts requiring larger operator applied manual force at the panel handle, undesirable force spikes that do not provide for smoother manual force/torque curves, requirement to use vehicle battery power to maintain third position hold, and/or temperature effects resulting in variable manual efforts required by the operator due to fluctuations in ambient temperature.

It is recognized that constantly applied forces in a counterbalance mechanism can be problematic due to variations in the geometry and/or operator positioning during the complete raise and lowering cycle of a closure panel, including the ability to provide for third position hold where desired. Further, it is desired to have an ability to tailor the amount of friction generated to the physical and geometrical aspects of the closure panel.

SUMMARY

It is an object of the present invention to provide a friction mechanism for application in a counterbalance mechanism that obviates or mitigates at least one of the above presented disadvantages.

A first aspect provided is a friction based counterbalance mechanism for coupling with a closure panel of a vehicle to assist in opening and closing of the closure panel, the counterbalance mechanism including: a first housing having a first pivot connection mount for connecting to one of a body of the vehicle and the closure panel; an extension member coupled to the first housing at one end and being extendable and retractable with respect to a second housing coupled adjacent to the first housing along an axis, the second housing for connecting by a second pivot connection mount to the other of the body and the closure panel; a sliding friction mechanism having: a shaped sleeve mounted on an exterior surface of the extension member, the shaped sleeve providing an exterior friction surface; and a resilient friction element mounted to the second housing in a fixed location on the axis, the resilient friction element positioned between second housing and the shaped sleeve and biased into contact with the exterior friction surface; wherein relative movement between the shaped sleeve and the resilient friction element as the extension member is displaced generates sliding friction between the resilient friction element and the shaped sleeve.

A second aspect provided is a sliding friction mechanism for mounting in a housing of a counterbalance mechanism for a closure panel of a vehicle, including: a sliding friction mechanism having: a shaped sleeve mounted on an exterior surface of an extension member, the shaped sleeve providing an exterior friction surface, the extension member being extendable and retractable with respect to the housing along an axis; and a resilient friction element mounted to the housing in a fixed location on the axis, the resilient friction element positioned between the housing and the shaped sleeve and biased into contact with an exterior friction surface of the shaped sleeve; wherein relative movement between the shaped sleeve and the resilient friction element as the extension member is displaced generates sliding friction between the resilient friction element and the shaped sleeve.

A third aspect provided is a method for operating a friction based counterbalance mechanism of a closure panel of a vehicle, the friction based counterbalance mechanism to assist in opening and closing of the closure panel by extending and retracting of an extension member with respect to a housing along an axis, the method comprising the steps of: using a rotational friction mechanism to provide rotating friction during said extending and retracting; and using a sliding friction mechanism to provide sliding friction during said extending and retracting; wherein said extending and retracting of the extension member along the axis imparts a rotational motion about the axis for operating the rotational friction mechanism while at the same time imparts a linear motion along the axis for operating the sliding friction mechanism.

A fourth aspect provide is a counterbalance mechanism of a closure panel of a vehicle, the counterbalance mechanism including an extension member to extend and retract with respect to a housing during opening and closing of the closure panel, the counterbalance mechanism including a rotational friction mechanism to provide rotating friction during said extending and retracting, and a sliding friction mechanism to provide sliding friction during said extending and retracting. The extending and retracting of the extension member imparts a rotational motion for operating the rotational friction mechanism to generate the rotating friction while at the same time imparts a linear motion for operating the sliding friction mechanism to generate the sliding friction, such that the rotating friction and the sliding friction act, such as act together, to resist the opening and closing of the closure panel.

Other aspects, including methods of operation, and other embodiments of the above aspects will be evident based on the following description and drawings.

BRIEF DESCRIPTION OF THE DRAWINGS

Reference is made, by way of example only, to the attached figures, wherein.

DETAILED DESCRIPTION OF EXAMPLE EMBODIMENTS

In this specification and in the claims, the use of the article "a", "an", or "the" in reference to an item is not intended to exclude the possibility of including a plurality of the item in some embodiments. It will be apparent to one skilled in the art in at least some instances in this specification and the attached claims that it would be possible to include a plurality of the item in at least some embodiments. Likewise, use of a plural form in reference to an item is not intended to exclude the possibility of including one of the item in some embodiments. It will be apparent to one skilled in the art in at least some instances in this specification and the attached claims that it would be possible to include one of the item in at least some embodiments.

Provided is a counterbalance mechanism 15 (i.e. an extension mechanism—see FIG. 1) having a sliding friction mechanism 15a (see FIG. 4 by example, further described below) that can be used advantageously with vehicle closure panels 14 to provide for open and close modes for operator assistance as discussed below, in particular for land-based, sea-based and/or air-based vehicles 10. Other applications of the counterbalance mechanism 15, in general for closure panels 14 both in and outside of vehicle applications, include advantageously assisting in optimization of overall hold and manual effort forces for closure panel 14 operation. It is recognized as well that the counterbalance mechanism 15 examples provided below can be used advantageously as the sole means of open and close assistance for closure panels 14 or can be used advantageously in combination (e.g. in tandem) with other closure panel 14 biasing members 37 (e.g. spring loaded hinges, biasing struts, etc.). In particular, the counterbalance mechanism 15 can be friction supplemented via one or more rotational friction mechanisms 46 (see FIGS. 4 and 6) and used to provide or otherwise assist in a holding force (or torque) for the closure panel 14, as further described below. Further, it is recognized that the counterbalance mechanism can be integrated with a biasing member 37 (see FIGS. 2 to 5) such as a spring loaded strut and/or provided as a component of a closure panel assembly, as further described below. It is recognized that the biasing member 37, incorporating the counterbalance mechanism 15, can be implemented as a strut (see FIGS. 2 and 3 as example types of struts). The strut can be of a biasing type (e.g. spring and/or gas charge supplying the bias), can include a drive unit for example with a lead screw 40 (see FIG. 4) with the counterbalance embodiment as shown.

Figure 1:
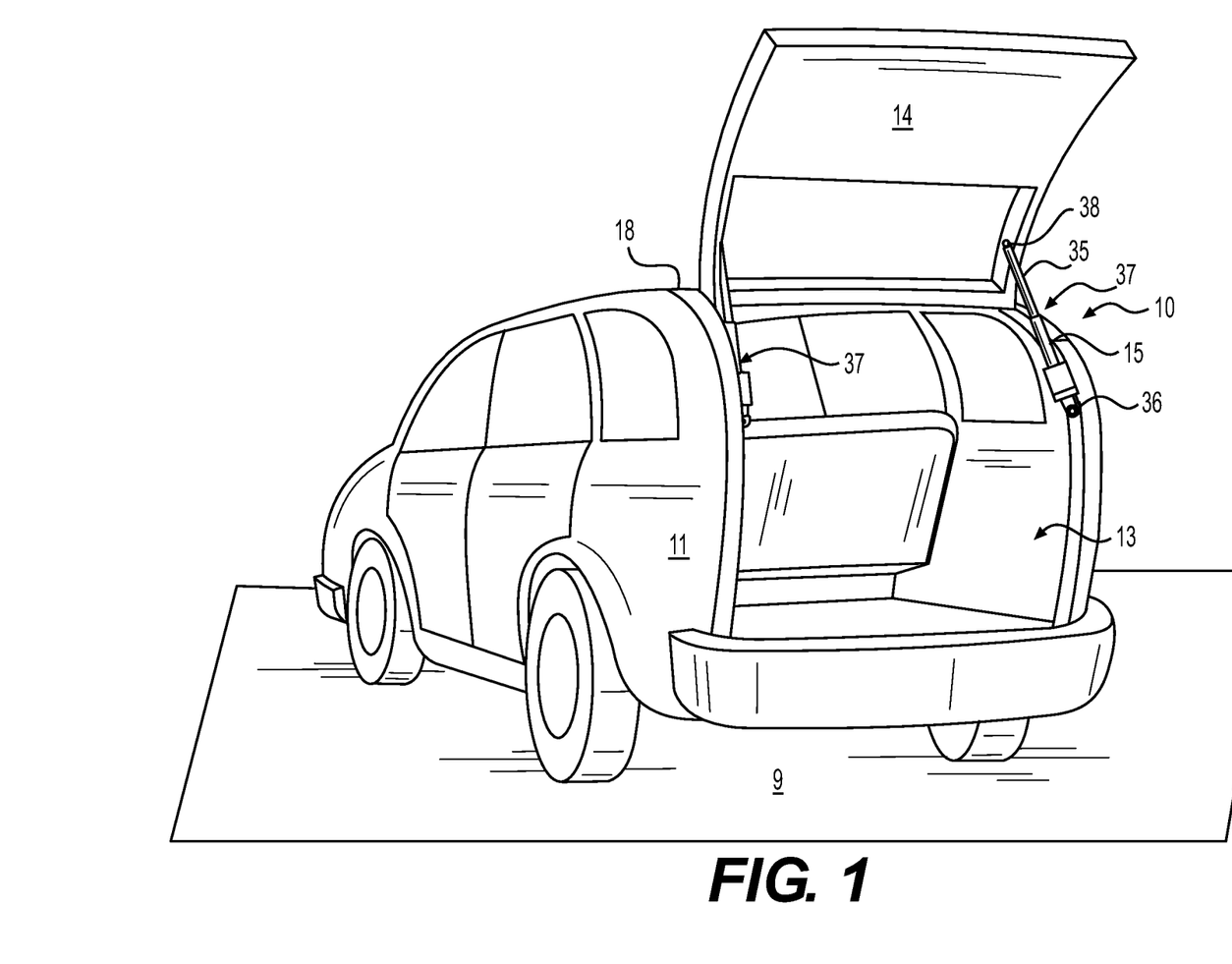
FIG. 1 is a perspective view of a vehicle with a closure panel assembly.

Referring to FIG. 1, shown is the vehicle 10 with a vehicle body 11 having one or more closure panels 14. One example configuration of the closure panel 14 is a closure panel assembly including the counterbalance mechanism 15 (e.g. incorporated in the biasing member 37 embodied as a strut by example). For vehicles 10, the closure panel 14 can be referred to as a partition or door, typically hinged, but sometimes attached by other mechanisms such as tracks, in front of an opening 13 which is used for entering and exiting the vehicle 10 interior by people and/or cargo. It is also recognized that the closure panel 14 can be used as an access panel for vehicle 10 systems such as engine compartments and also for traditional trunk compartments of automotive type vehicles 10. The closure panel 14 can be opened to provide access to the opening 13, or closed to secure or otherwise restrict access to the opening 13. It is also recognized that there can be one or more intermediate hold positions of the closure panel 14 between a fully open position and fully closed position, as provided at least in part by the counterbalance mechanism 15 as further described below. For example, the counterbalance mechanism 15 can assist in biasing movement of the closure panel 14 away from one or more intermediate hold position(s), also known as Third Position Hold(s) (TPHs) or Stop-N-Hold(s), once positioned therein. It is also recognized that the counterbalance mechanism 15 can be provided as a component of the closure panel assembly, such that the counterbalance mechanism 15 component can be separate from the one or more biasing members 37. It is also recognized that the rotational friction mechanism 46 can be provided separately from the sliding friction mechanism 15a, i.e. the counterbalance mechanism 15 can be configured as including the sliding friction mechanism 15a alone, the rotational friction mechanism 46 alone, or both the sliding friction mechanism 15a and the rotational friction mechanism 46.

Additionally, one characteristic of the closure panel 14 is that due to the weight of materials used in manufacture of the closure panel 14, some form of force assisted open and close mechanism (or mechanisms) can be used to facilitate operation of the open and close operation by an operator (e.g. vehicle driver) of the closure panel 14. The force assisted open and close mechanism(s) can be provided by the counterbalance mechanism 15, any biasing members 37 (e.g. spring loaded hinges, spring loaded struts, gas loaded struts, electromechanical struts, etc.) when used as part of the closure panel assembly, such that the counterbalance mechanism 15 is configured to provide a friction based holding torque (or force) (via the rotational friction mechanism 46 and/or the sliding friction mechanism 15a) that acts against the weight of the closure panel 14 on at least a portion of the panel open/close path about the third position hold, in order to help maintain the position of the closure panel 14 about the third position hold.

It is recognized that a strut version of the counterbalance mechanism 15 can have the lead screw 40 operated passively such that the lead screw 40 is free to rotate about its longitudinal axis 132 but is not actively driven by a motor.

It is recognized that a travel member 47 (see FIG. 4) can be coupled to the lead screw 40, such that the travel member 47 is connected to an extension member 35 (e.g. solid rod, tube, etc.) connected to the closure panel 14. It can be the travel member 47 which is driven by extension and retraction of the extension member 35 with respect to a housing 41*a,b* of the counterbalance mechanism 15. As further discussed below, displacement of the travel member 47 along the longitudinal axis 132 is used to drive rotation of the lead screw 40, for example. In this manner, the extension member 35 pivotally connects to the closure panel 14 at pivot connection 36. It is recognized that the extension member 35 itself can be configured as a non-biasing element (e.g. a solid rod) or can be configured as a biasing element (e.g. a gas or spring assisted extension strut), as desired the extension member 35 can also be referred to as a nut tube 35, as desired. As such, the counterbalance mechanism 15 for the vehicle 10 includes the extensible extension member 35 and is connected by the pivot connection mount 36 (e.g. ball joint), located at a lower end of the housing 41*b*, which can be pivotally mounted to a portion of the vehicle body 11 adjacent to an interior cargo area in the vehicle 10. The second pivot connection mount 38 (e.g. ball joint) is attached to the distal end of extensible extension member 35 and is pivotally mounted to the closure panel 14 of the vehicle 10.

Figure 4:
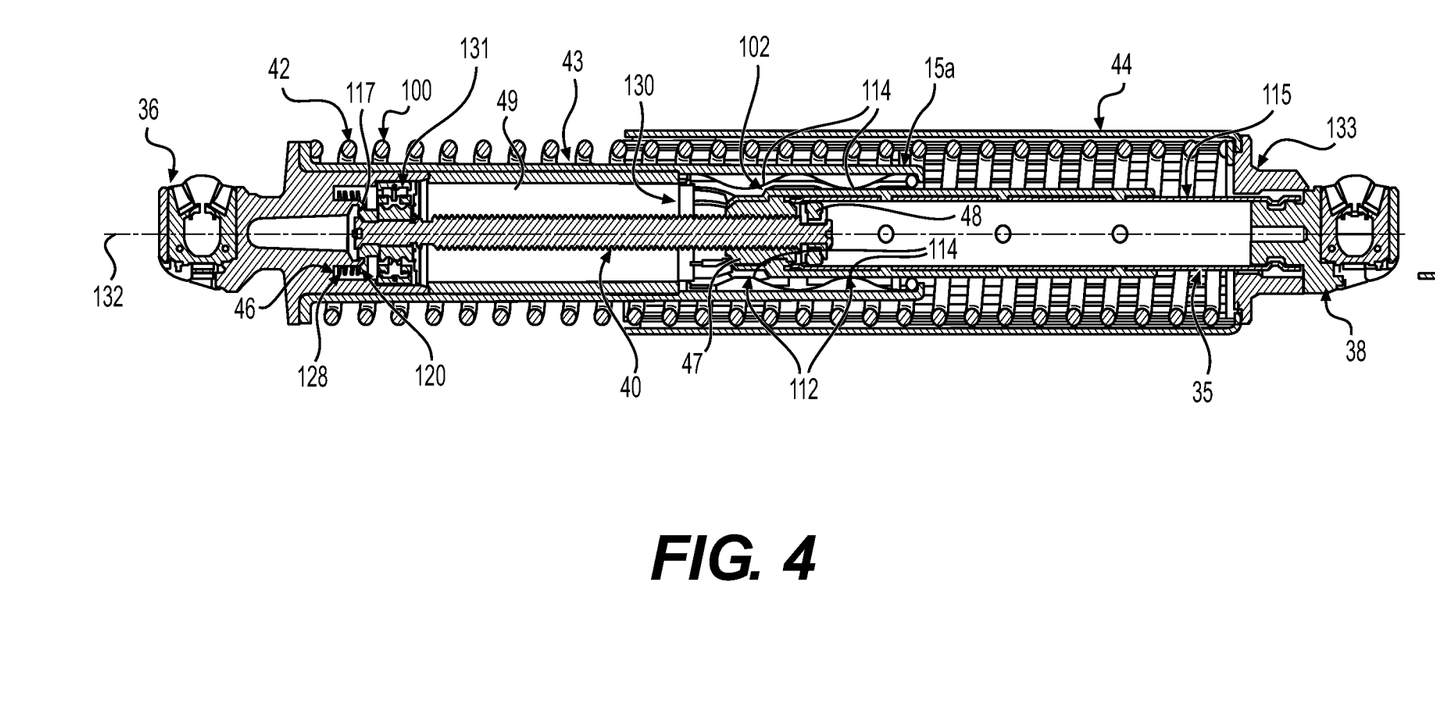
FIG. 4 is a cross sectional view of the biasing member of FIG. 2.
Figure 5:
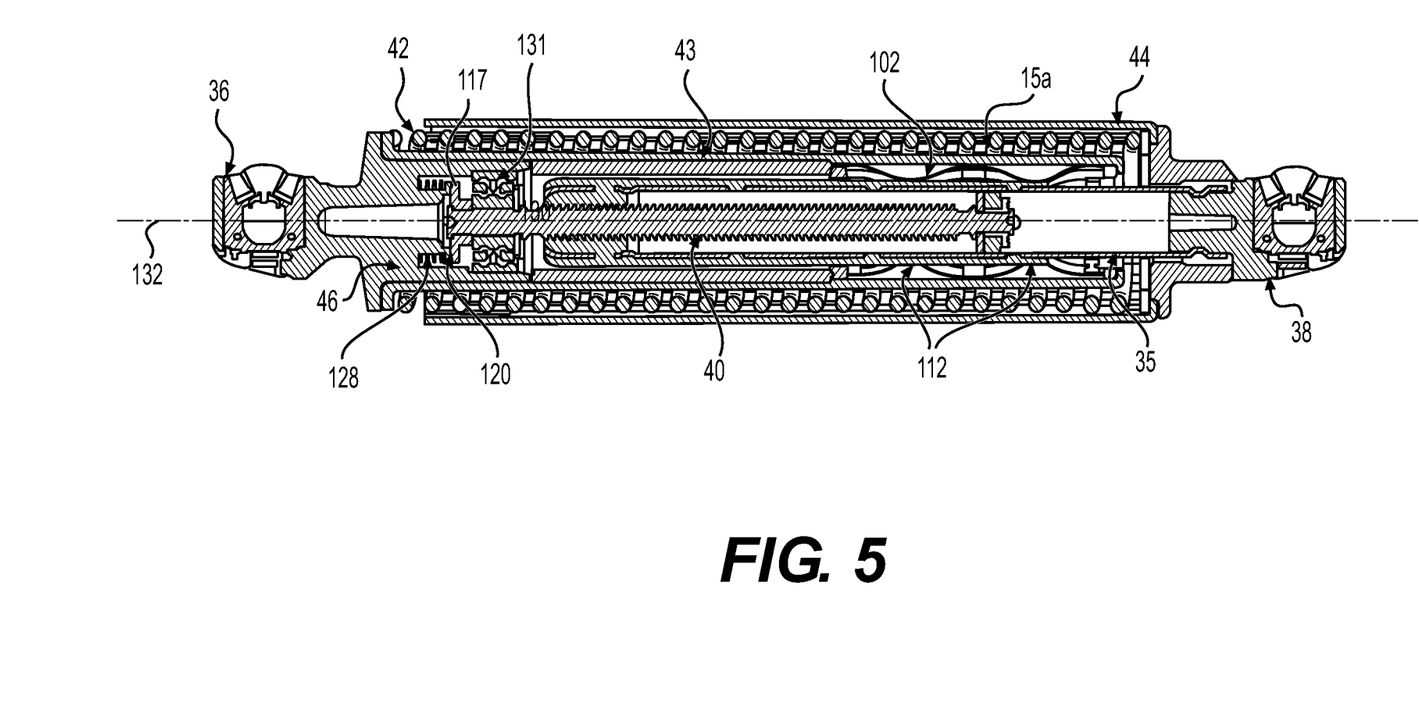
FIG. 5 is a cross sectional view of an example biasing member of FIG. 3.

It is recognized that the counterbalance mechanism 15 can be configured as an independent counterbalance mechanism for the closure panel 14 and/or can be configured as a component of the biasing member 37 (e.g. incorporated as an internal component of a strut including a spring 42—i.e. a resilient element, see FIGS. 4,5).

In terms of vehicles 10, the closure panel 14 may be a lift gate as shown in FIG. 1, or it may be some other kind of closure panel 14, such as an upward-swinging vehicle door (i.e. what is sometimes referred to as a gull-wing door) or a conventional type of door that is hinged at a front-facing or back-facing edge of the door, and so allows the door to swing (or slide) away from (or towards) the opening 13 in the body 11 of the vehicle 10. Also contemplated are sliding door embodiments of the closure panel 14 and canopy door embodiments of the closure panel 14, such that sliding doors can be a type of door that open by sliding horizontally or vertically, whereby the door is either mounted on, or suspended from a track that provides for a larger opening 13 for equipment to be loaded and unloaded through the opening 13 without obstructing access. Canopy doors are a type of door that sits on top of the vehicle 10 and lifts up in some way, to provide access for vehicle passengers via the opening 13 (e.g. car canopy, aircraft canopy, etc.). Canopy doors can be connected (e.g. hinged at a defined pivot axis and/or connected for travel along a track) to the body 11 of the vehicle at the front, side or back of the door, as the application permits.

Referring again to FIG. 1, in the context of a vehicle application of a closure panel by example only, the closure panel 14 is movable between a closed position (not shown) and an open position (shown). In the embodiment shown, the closure panel 14 pivots between the open position and the closed position about a pivot axis 18, which is preferably configured as horizontal or otherwise parallel to a support surface 9 of the vehicle 10. In other embodiments, the pivot axis 18 may have some other orientation such as vertical or otherwise extending at an angle outwards from the support surface 9 of the vehicle 10. In still other embodiments, the closure panel 14 may move in a manner other than pivoting, for example, the closure panel 14 may translate along a predefined track or may undergo a combination of translation and rotation between the open and closed position.

Referring again to FIG. 1, as discussed above, the counterbalance mechanism 15 examples provided below for the closure panel assembly can be used as the sole means of open and close assistance for the inhibition of sag by the closure panels 14 themselves, or can be used in combination (e.g. in tandem or otherwise integrated) with one or more other separate closure panel biasing members 37 (e.g. spring loaded hinges, struts such as gas struts or spring loaded struts, etc.) that provide a primary connection of the closure panel 14 to the vehicle body 11 at pivot mount connections 36, 38 (see FIG. 1). In general operation of the closure panel 14, the counterbalance mechanism 15 is coupled at a proximal end to the vehicle 10 (e.g. the body 11), optionally including the rotational friction mechanism 46, and is coupled at a distal end (used to connect the closure panel 14 as a secondary connection other than the hinge at the pivot axis 18 to the vehicle body 11) to the vehicle 10 (e.g. the closure panel 14). As such, the sliding friction mechanism 15*a* of the counterbalance mechanism 15 (with optionally the rotational friction mechanism 46) can be pivotally attached to the closure panel 14 at spaced apart locations as shown (for example as components of the biasing member 37). It is also recognized that the counterbalance mechanism 15 can include both the rotational friction mechanism 46 and the sliding friction mechanism 15*a*, in order to provide for the advantageous combined contribution of both sliding and rotational friction to the counterbalance force of the counterbalance mechanism 15. The simultaneously generated frictions may in one possible configuration be generated as a result of a biasing or resilient element, such as a spring, acting on a friction member or element for urging the friction member of element against a body.

Referring again to FIG. 1, one or more optional closure panel biasing members 37 (e.g. not containing the counterbalance mechanism 15) can be provided which urge the closure panel 14 towards the open position throughout at least some portion of the path between the open position and the closed position and which assist in holding the closure panel 14 in the open position. The closure panel biasing members 37 can be, for example, gas extension struts which are pivotally connected at their proximal end to the closure panel 14 and at their distal end to the vehicle body 11. In the embodiment shown, there are two biasing members 37 (one on the left side of the vehicle 10 and one on the right side of the vehicle 10). In one example, see FIG. 1, the counterbalance mechanism 15 can be coupled to the closure panel 14 on one side of the closure panel 14 as mounted internally to the biasing element 37, and the at another side of the closure panel 14 can be a differently configured biasing element 37 (e.g. not including the counterbalance mechanism with the drive system 16).

As the closure panel 14 moves between the open and closed positions, the torques (or forces) exerted on the closure panel 14 by the biasing members 37 and by the weight of the closure panel 14 itself will vary. In one embodiment, the closure panel 14 can have some position between the open and closed positions at which the torque (or force) exerted on the closure panel 14 by the biasing members 37 cancels out the torque (or force) exerted on the closure panel 14 by the weight of the closure panel 14 (i.e. the torque or force of the biasing member(s) 37 acts against the weight of the closure panel 14). Above this point (which can be referred to as a balance point or otherwise referred to as the intermediate hold position), the torque (or force) exerted by the biasing members 37 can overcome the torque (or force) exerted by the weight of the panel 14 thus resulting in a net torque (or force) away from the closed position, thus biasing the closure panel 14 towards the open position (i.e. the torque or force of the biasing member(s) 37 acts against the weight of the closure panel 14). Below this point, the torque (or force) exerted by the weight of the panel 14 can overcome the torque (or force) exerted by the biasing members 37 thus resulting in a net torque (or force) towards the closed position, thus biasing the closure panel 14 towards the closed position. However, even in travel of the closure panel 14 towards the closed position, the torque or force of the biasing member(s) 37 acts against the weight of the closure panel 14. In this manner, the effect of the biasing member(s) 37 is to provide a torque or force that always acts against the weight of the closure panel 14 (i.e. always supplies a closing torque or force). It is recognized that "3rd position hold" can also be referred to as an "intermediate hold position" or a "stop and hold position".

Further to operation of the above-described closure panel biasing members 37, one or more counterbalance mechanisms 15 are provided in addition to (as shown in FIG. 1) or in substitution of the biasing members 37. For example, one or more counterbalance mechanisms 15 can be provided which act to maintain or otherwise inhibit the closure panel 14 from travelling towards the closed position, i.e. assist in holding the closure panel 14 in the open position (e.g. intermediate hold positions and/or the fully open position). The one or more counterbalance mechanisms 15 can be, for example, coupled to or otherwise mounted on the vehicle body 11 and pivotally connected to the closure panel 14.

Figure 6:
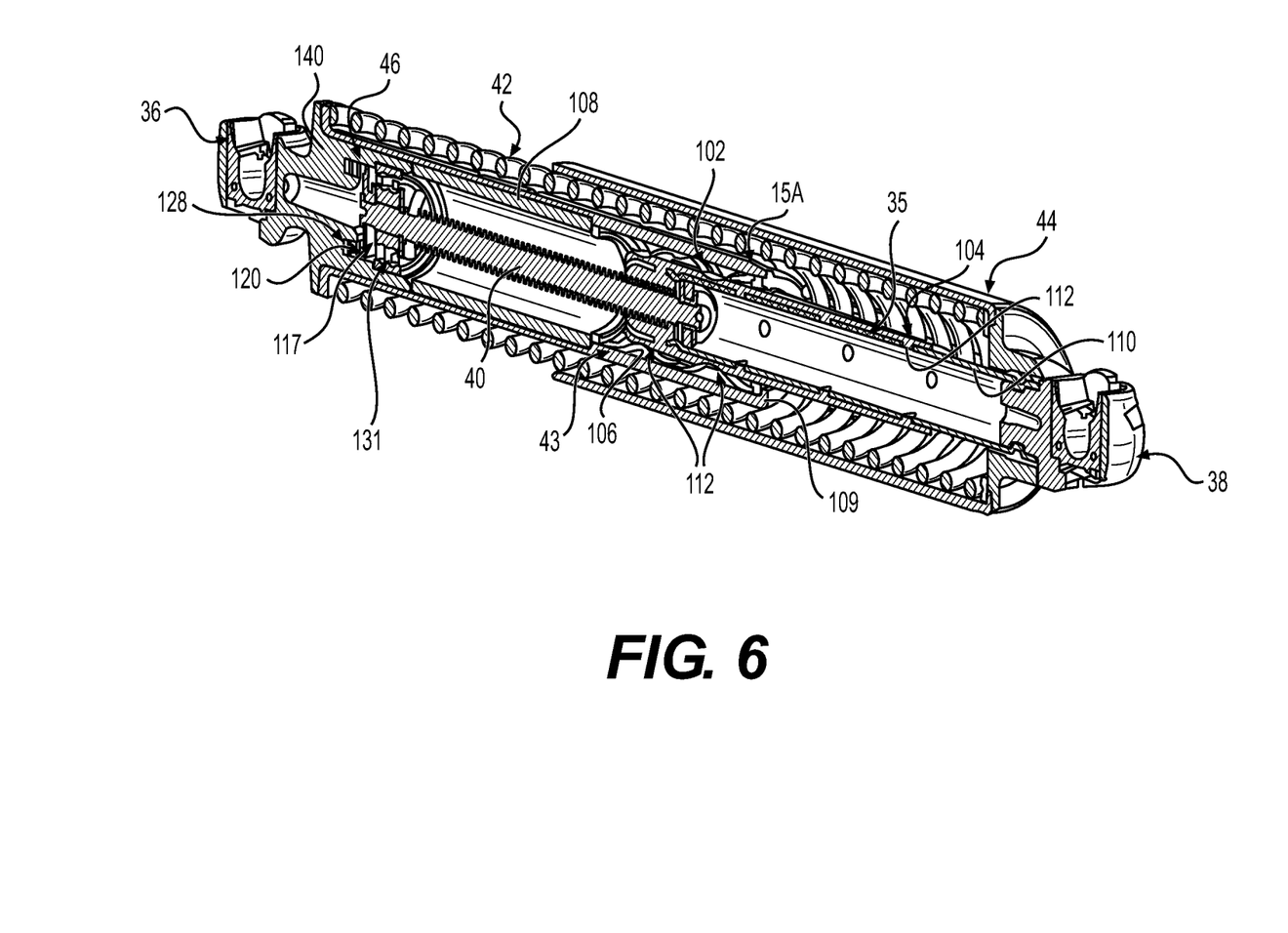
FIG. 6 is a perspective cross sectional view of the biasing member of FIG. 2.
Figure 7:
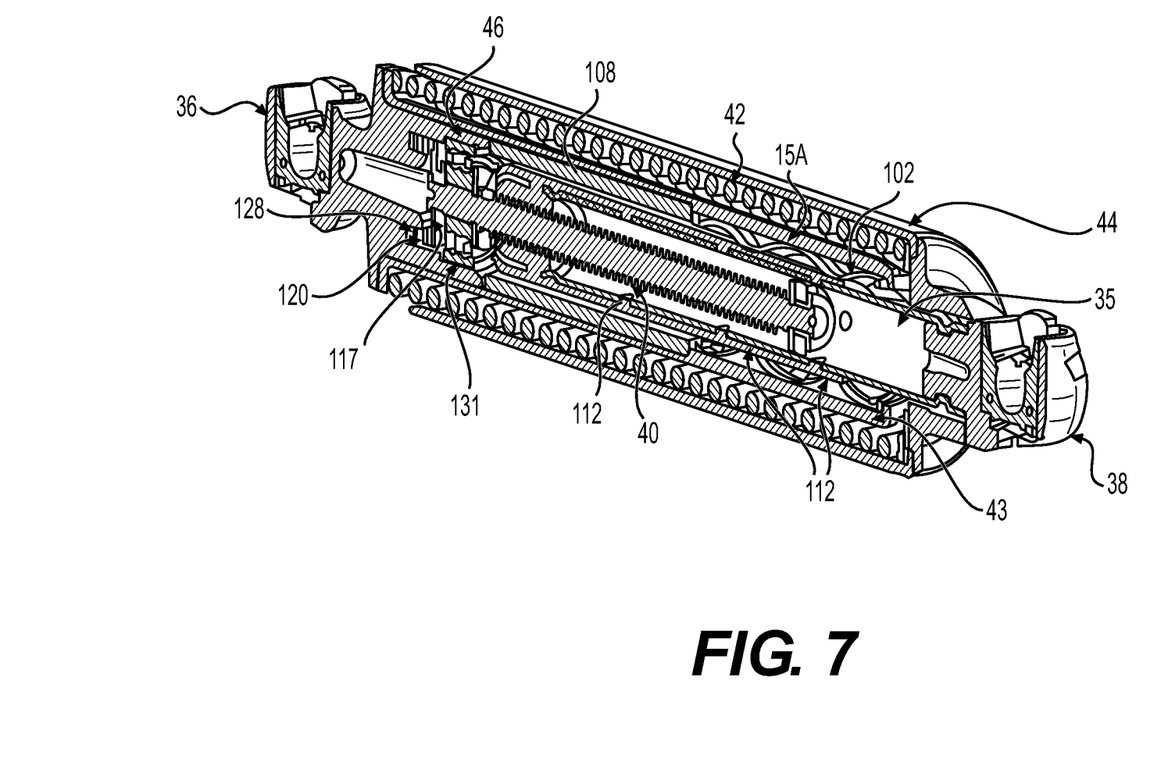
FIG. 7 is a perspective cross sectional view of an example biasing member of FIG. 3.
Figure 8:
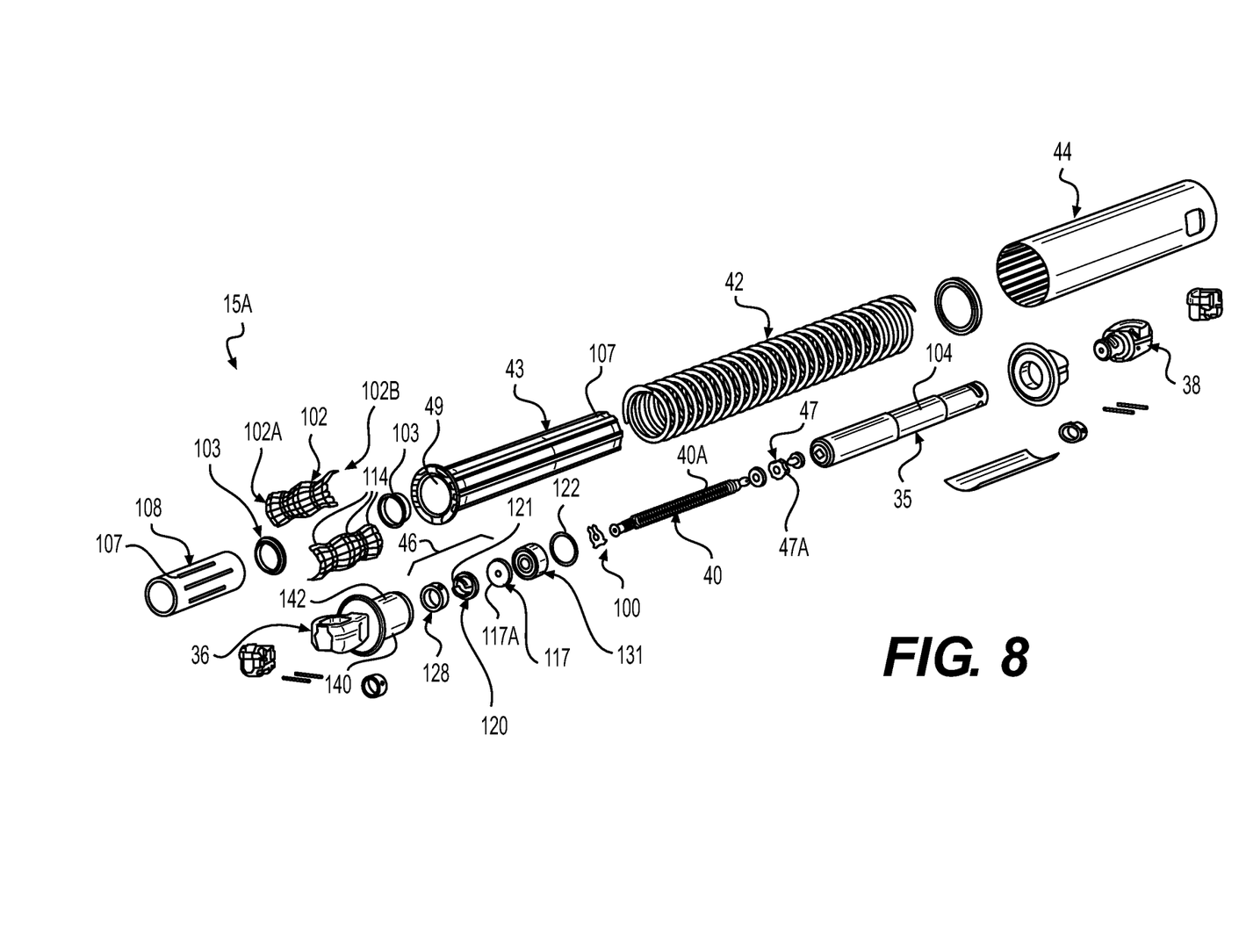
FIG. 8 is an exploded view of the friction mechanism of FIG. 4.

Referring to FIGS. 6 and 8, shown is the rotational friction mechanism 46 having a friction body 117 (e.g. having a contact surface 117a) positioned on the axis 132, such that the friction body 117 is mounted on one end 100 of the lead screw 40, such that the friction body 117 experiences conjoint rotation with the lead screw 40 (e.g. as driven by translation of the travel member 47 along the length of the lead screw 40 as the housing 41a extends and retracts with respect to housing 41b). The rotational friction mechanism 46 also includes a resilient element 128 (e.g. spring) used to bias a contact body 120 (e.g. ring) into engagement with the contact surface 117a of the friction body 117. The resilient element 128 is used to bias the contact body 120 against the friction body 117 in order to generate friction there between. It is recognized that increasing or decreasing the bias of the resilient element 128 (e.g. via using different sized springs) can provide a corresponding increase or decrease in a magnitude of the friction being generated between the contact body 120 and the friction body 117.

For example, the contact body 120 can have slots or tabs 121 that can mate with corresponding tabs or slots 142 in a mechanism housing 140, in order to resist rotational movement of the contact body 120 about the longitudinal axis 132 as the friction body 117 rotates. Accordingly, the contact body 120 (also referred to as a contact ring) is positioned to one side of the friction body 117. For example, anti-rotation slots 121 can be positioned on the contact body 120 in order to inhibit rotation of the contact body 120 with respect to the mechanism housing 140, as the friction body 117 rotates. A clip 122 is also mounted on the axis 132, thus defining the position of the friction body 117 with respect to a bearing 131 used to position the one end 100 of the lead screw 40 on the axis 132. The bearing 131 can be seated in one end of the housing 140 (see FIG. 4). The rotational friction mechanism 46 also can have the housing 140 with anti-rotation tabs 142 (shown in ghosted view) for mating with anti-rotation slots 121 of the contact body 120, in order to inhibit rotation of the contact body 120 during rotation of the lead screw 40 (and connected friction body 117).

Referring to FIGS. 4, 5, 8, the counterbalance mechanism 15 can have the spring 42 (e.g. resilient element) mounted on a spring support tube 43 as the housing 41b and covered by a spring cover tube 44 as the housing 41a. The pivot mount connection 38 (e.g. ball socket 38) is connected (e.g. welded or crimped) to the extension member 35 (e.g. nut tube 35) at one end and the travel member 47 is connected (e.g. crimped via bushing 48) to the extension member 35 at the other end. As such, as the travel member 47 travels along the lead screw 40 (along the axis 132), the extension member 35 extends/retracts with respect to a cavity 49 of the spring support tube 43. As such, the nut tube 35 is one example of the extension member 35 of FIG. 1. As such, the nut tube 35 is can be interchanged with the extension member 35 for exemplary purposes only. The travel member 47 (e.g. FIG. 4) can be fixed (e.g. non-rotating about the axis 132 along the lead screw 40). It is recognized that the travel member 47 may not rotate around the lead screw 40, rather the travel member 47 can travel linearly along the longitudinal axis 132 and linearly along a body of the lead screw 40 as the lead screw 40 rotates (is rotated) about the longitudinal axis 132, such that the travel member 47 has a threaded bore 47a engaging external threads 40a of the lead screw 40.

Referring again to FIGS. 4 and 8, one or more leaf springs 102 (e.g. one or more resilient friction elements 102) of the sliding friction mechanism 15a are positioned about an exterior friction surface 104 of the extension member 35. The one or more leaf springs 102 (e.g. composed of metal material) of the sliding friction mechanism 15a are positioned/mounted on an inside surface 106 of the spring support tube 43, and distanced from the mechanism housing 140 by a spacer 108. As such, the leaf spring(s) 102 are fixedly positioned along the axis 132 between the spacer 108 and a retaining lip 109 of the spring support tube 43. Accordingly, the leaf spring(s) 102 maintain their axial position on the axis 132, as the extension member travels in and out of the housing 41b (i.e. the spring support tube 43). It is recognized that the resilient friction element(s) 102 could also be configured as a coil spring positioned between the inside surface 106 and the exterior friction surface 104, such that the resilient friction element(s) 102 are biased into engagement with the exterior friction surface 104. Hereafter for example only, the resilient friction elements 102 are referred to as leaf springs 102.

Figure 9:
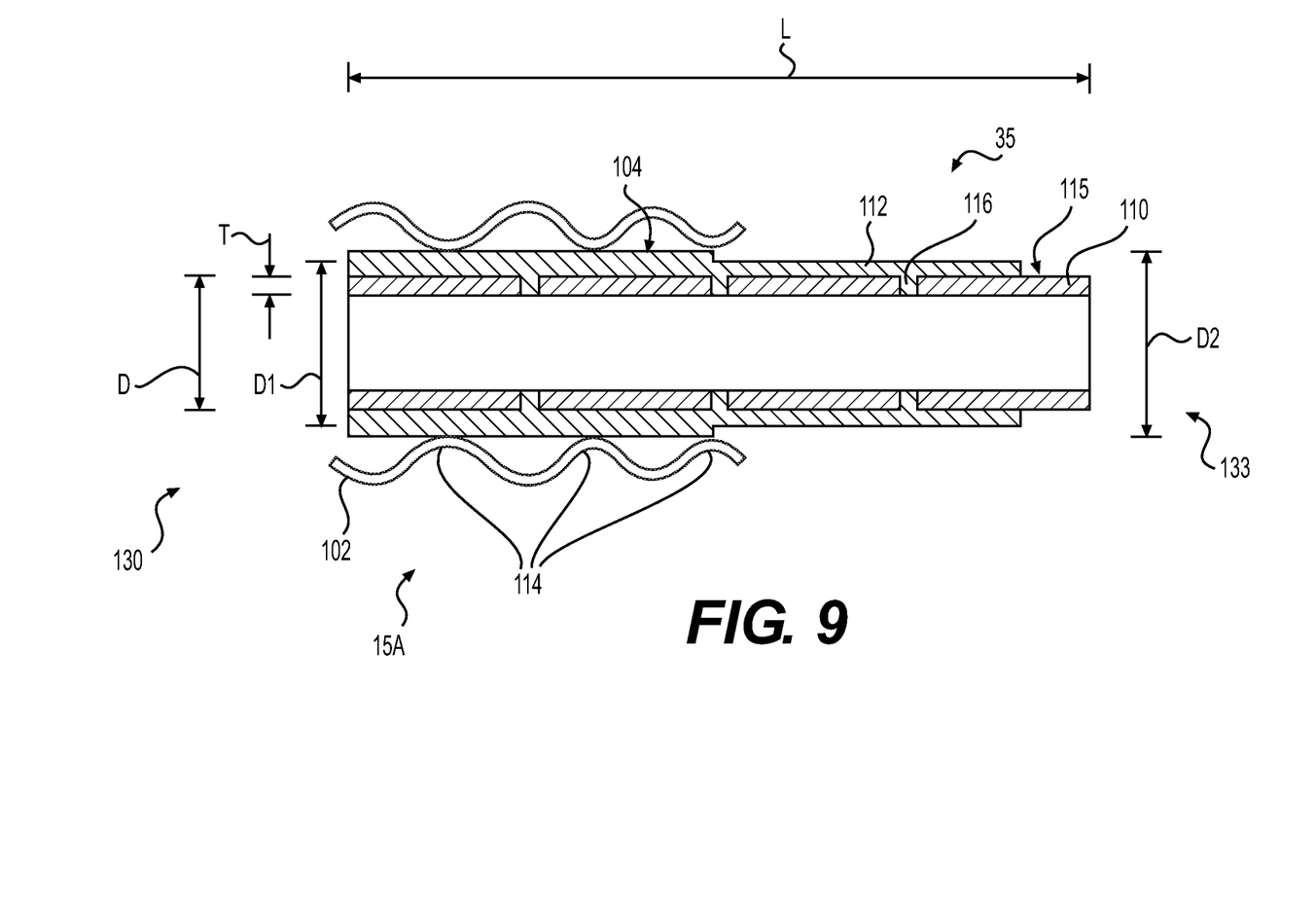
FIG. 9 is a cross sectional view of the sliding friction mechanism shown in FIG. 4.

Referring to FIG. 9, shown is a cross sectional view of the extension member 35 having a main body 110 and a shaped sleeve 112 (e.g. composed of plastic material—e.g. overmold material), such that the shaped sleeve 112 provides the exterior friction surface 104. The shaped sleeve 112 is mounted on the exterior surface 115 of the extension member 35. For example, the exterior surface 115 can have indentation(s) 116 (or perforation(s) 116), such that the material of the shaped sleeve 112 can be located in the indentation/perforation 116 in order to help inhibit relative movement between the exterior surface 115 of the main body 110 and the shaped sleeve 112 during movement of the contact portions 114 (see FIG. 8) of the leaf springs 102 over the exterior friction surface 104. As such, the sliding friction mechanism 15a involves the contact portion(s) 114 of the leaf spring(s) 102 biased into contact with the exterior friction surface 104 of the shaped sleeve 112. Therefore, as the extension member 35 moves into and out of the housing 41b, (see FIGS. 2, 3) the contact portions 114 of the leaf spring(s) 102 slide against the exterior friction surface 104 and generate friction used to provide at least a portion (separate from that provided by the rotational friction mechanism 46 and/or the spring 42) contributing to the composite holding force of the counterbalance mechanism 15. The shaped sleeve 112 may be provided on the housing 41b for example as integrated on an inner surface of housing 41b or as a tubular insert fitted along the inner surface, while leaf spring(s) 102 provided on the outer surface of the extension member 35 in a possible configuration.

Referring again to FIG. 9, the shaped sleeve 112 can provide an exterior diameter D that varies along a length L of the shaped sleeve 112. For example, in the case where the main body 110 is of constant cross sectional dimension, the thickness T of the shaped sleeve 112 can be varied along the length L in order to provide the variance in the exterior diameter D. Therefore, as the leaf spring(s) 102 are fixed in position, as the exterior diameter D increases, the amount of friction generated between the contact portion(s) 104 and the exterior friction surface 104 will increase, due to the biasing (i.e. resilient nature) of the leaf spring(s) 102 forcing the contact portion(s) into engagement with the exterior friction surface 104. Shown in FIG. 9 is an example where the exterior diameter D has a first exterior diameter D1 greater than a second exterior diameter D2, such that the first exterior diameter D1 is positioned closer to the travel member 47 connected to the extension member 35 (see FIG. 4). In this example, the sliding friction force generated between the contact portion(s) 114 and the exterior friction surface 104 of the shaped sleeve 112 will be greater when the closure panel 14 is positioned towards the open position (see FIG. 1) and will be lesser when the closure panel 14 is positioned towards the closed position. It is also recognized that the exterior diameter D can vary continuously along the length L, as desired, for example varying from first exterior diameter D1 at one end 130 down to the second exterior diameter D2 at another end 133 of the extension member 35.

Referring to FIGS. 1, 2, 3, 4 and 5, operation of the counterbalance mechanism 15 can be as follows for the case where the operator of the vehicle 10 is closing the closure panel 14 (e.g. from the open position to the closed position). Firstly, the second pivot connection mount 38 (connected to the closure panel 14) is displaced in a compress direction CD as the closure panel 14 is moved towards the closed position. As the second pivot connection mount 38 is connected to the another end 133 (see FIG. 4) of the extension member 35, the extension member 35 and the resilient element 42 are pushed in the compress direction CD (i.e. the second pivot connection mount 38 moves towards the first pivot connection mount 36 along the axis 132). As the extension member 35 moves, the travel member 47 connected to the one end 130 also moves in the compress direction and rotates the lead screw 40 which in turn rotates the friction body 117. In order to provide the rotation friction mechanism 46, as the friction body 117 (e.g. composed of metal material) rotates about the axis 132 and relative to the contact body 120 (e.g. composed of plastic material), the resilient element 128 applies a normal force on the contact surface 117a of the friction body 117 via the contact body 120, thus creating a rotational friction torque which is multiplied through the lead screw 40 and travel member 47 interface (i.e. threaded coupling of threads 40a with threads 47a). The Normal Force and Friction Torque can be constant, as configured by the strength of the spring constant of the resilient element 128 and the coefficient of friction between the friction body 117 and the contact body 120, thus providing a desired (e.g. optional) portion of the Friction (e.g. constant friction portion) for Stop-&-Hold functionality of the counterbalance mechanism 15.

In terms of operation of the sliding friction mechanism 15a, which can be in tandem with the rotational friction mechanism 46, the extension member 35 has the shaped sleeve 112 (e.g. a plastic overmold on the body 110) to provide the exterior (e.g. interface) friction surface 104 for the leaf spring(s) 102 (e.g. a metal material) sliding along the shaped sleeve 112 as the closure panel 14 is opened or closed. As discussed above, the leaf spring(s) 102 are held axially between the spacer 108 and the end of the spring support tube 43 (e.g. by the retaining lip 109 of the spring support tube 43). The leaf spring(s) 102 are contained radially within an inner diameter of the spring support tube 43.

It is recognised that the leaf spring(s) 102 have an interference fit with the outer diameter (i.e. friction surface 104) of the shaped sleeve 112 mounted on the exterior surface 115 of the extension member 35. The shaped sleeve 112 outer diameter D can be tapered (either discretely or continuously varied) such that the maximum interference with the leaf spring(s) 102 is in the closure panel 14 open position while the minimum interference with the leaf spring(s) 102 is in the closure panel 14 closed position. For example the taper may be a linear taper providing a constant change in diameter D over the length, or a non-linear taper providing for example other non-constant changes in diameter D over the length, such as a convex or concave type taper. The interface between the leaf spring(s) 102 and the shaped sleeve 112 mounted on the extension member 35 provides the desired Variable portion (e.g. sliding friction mechanism 15a) of the Friction for Stop-&-Hold functionality of the counterbalance mechanism 15. For example, in the case where both the rotational friction mechanism 46 and the sliding friction mechanism 15a are used in the counterbalance mechanism 15, the same constant friction (due to the fixed spring constant and fixed coefficient of friction) and variable friction (due to the differing diameters D1, D2) are generated in the open direction for the closure panel 14.

Figure 2:
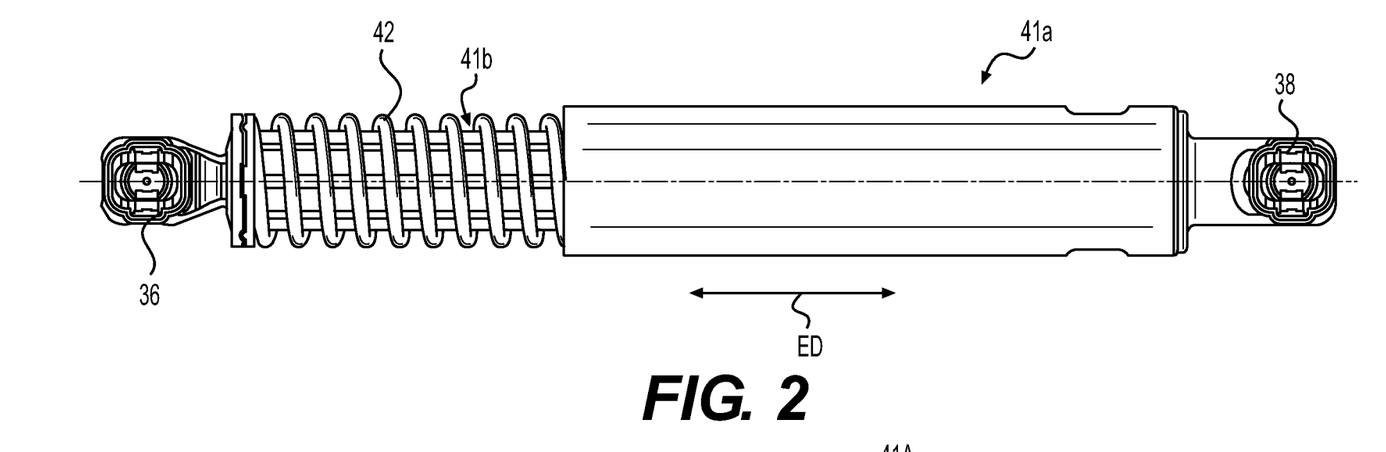
FIG. 2 is an external view of an example biasing member of FIG. 1 in an extended position.
Figure 3:
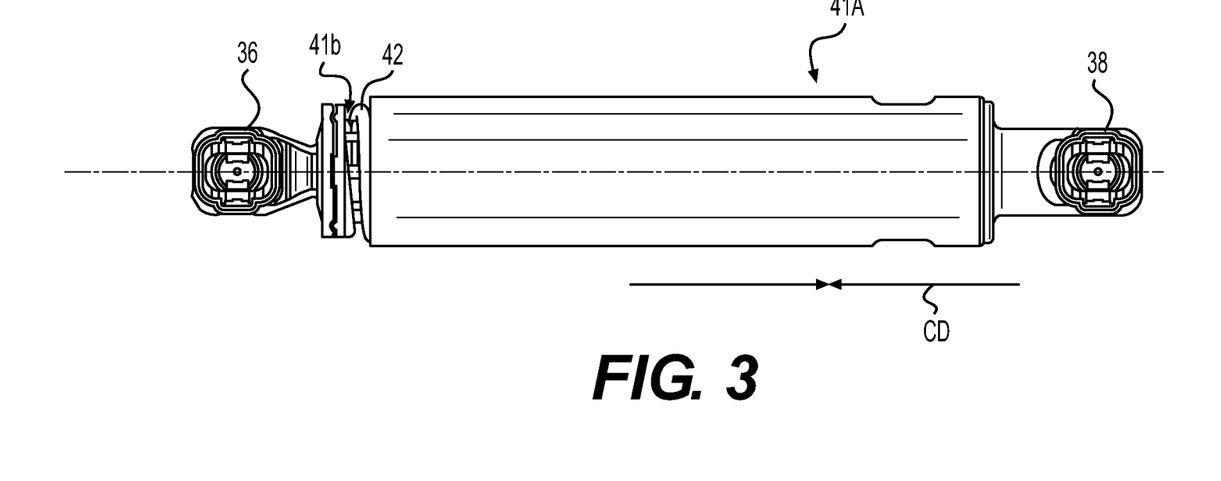
FIG. 3 is an external view of an example biasing member of FIG. 1 in a retracted position.

In example operation of opening of the closure panel 14 (e.g. from fully closed to fully open), as shown by an extend direction ED of FIG. 2, the operator opens the closure panel 14 by pulling on the closure panel towards the open position (see the closure panel 14 in FIG. 1). As the counterbalance mechanism 15 is extended in the extend direction ED, the travel member 47 is pushed along the axis 132 by the extension member 35 (the spring 42 of the counterbalance mechanism 15 is extended). As the travel member 47 moves (e.g. translates) away from the first pivot connection mount 36, the lead screw 40 is rotated about the axis 132, which in turn rotates the friction body 117. The rotating friction body 117 causes rotating friction generated by the described rotational friction mechanism 46 and the relative displacement between the shaped sleeve 112 (of the extension member 35) and the leaf spring(s) 102 provides the sliding friction generated by the sliding friction mechanism 15a as described.

As described above, the friction based counterbalance mechanism 15 is for coupling with the closure panel 14 of the vehicle 10 to assist in opening and closing of the closure panel 14. The counterbalance mechanism 15 can include: the housings 41b having the first pivot connection mount 36 for connecting to one of the body 11 of the vehicle 10 and the closure panel 14; the extension member 35 (also referred to as the rod 35 by example in FIG. 1) coupled to the housing 41a and being extendable and retractable with respect to the housing 41b, the extension member 35 for connecting by the second pivot connection mount 38 to the other of the body 11 and the closure panel 14; the rotational friction mechanism 46 mounted in the housing 41b having contact body 120 positioned on the axis 132, the friction body 117 positioned on a lead screw 40 housed in the housing 41b and adjacent to the contact body 120, the friction body rotatable about the axis 132 relative to the contact body 120 during rotation of the lead screw 40 to generate rotational friction between the contact body 120 and the friction body 117, and the resilient element 128 positioned on the axis 132 between the contact body 120 and a mechanism housing connected to the housing 41b, such that the resilient element 128 exerts an axial force on the contact body 120 to force the contact body 120 against the friction body 117.

Further, the lead screw 40 is coupled to the extension member 35 on one end 130 (via a travel member 47) and connected to the friction body 117 on the other end 100, such that extension and retraction of the extension member 35 with respect to the housing 41b causes rotation of the lead screw 40 about the axis 132. Further, as the extension member 35 is moved axially, the shaped sleeve 112 (mounted on the extension member 35) is displaced relative to the leaf spring(s) 102 fixed in position on the axis between the spacer 108 and the end (e.g. retaining lip 109) of the housing 41b. The relative displacement between the contact portions 114 of the leaf spring(s) 102 with the friction surface 104 of the shaped sleeve 112 provides for operation of the sliding friction mechanism 15a to generate the sliding friction between the leaf spring(s) 102 and the shaped sleeve 112.

As such, the sliding friction mechanism 15a can include the shaped sleeve 112 (having the friction surface 104), the one or more resilient friction elements 102, the spacer 108 and the retaining lip 109. Also, one or more retaining elements 103 (e.g. rings 103) can be used to connect each end 102a, 102b of the resilient friction elements 102 with the respective spacer 108 and retaining lip 109. As the spacer 108 and retaining lip 109 are inhibited from rotation about the axis 132 as the extension member 35 extends and retracts, e.g. via splines 107 on the spacer 108 and on the spring support tube 43, the retaining elements 103 can also inhibit rotation of the resilient friction elements 102 about the axis 132. Further, the stated interference fit between the resilient friction elements 102 and the adjacent outer diameter D (i.e. exterior friction surface 104) of the shaped sleeve 112 can inhibit rotation of the resilient friction elements 102 about the axis 132.

Figure 10:
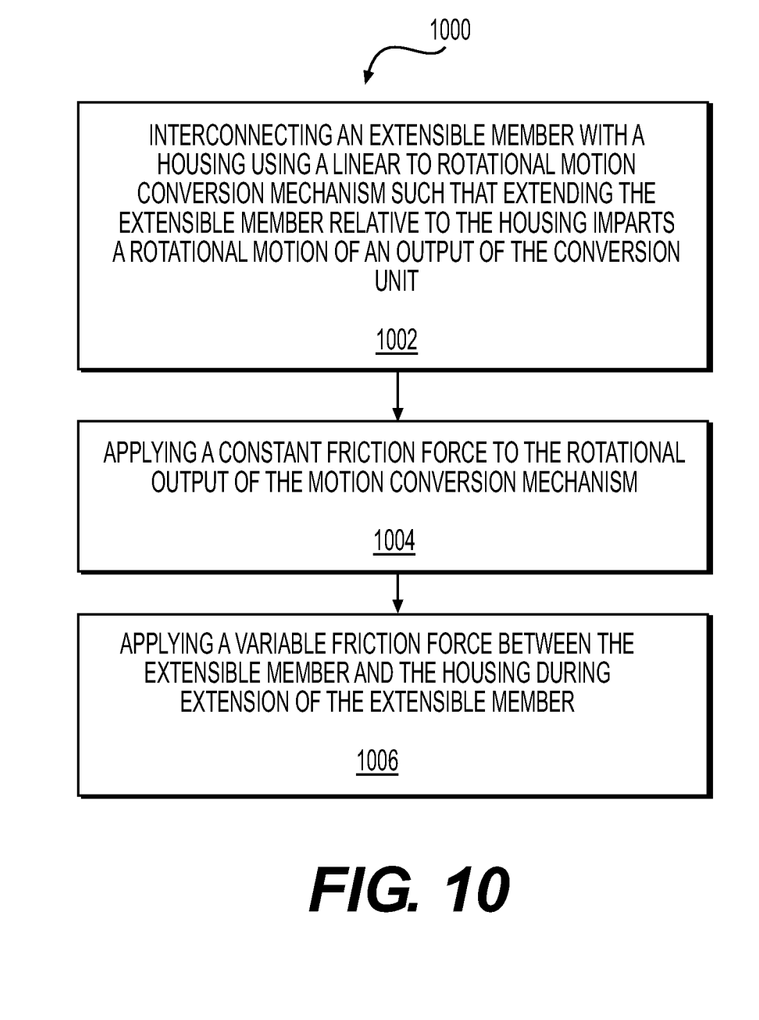
FIGS. 10 and 11 are example operations of the friction mechanisms of the counterbalance mechanism of FIGS. 1 through 9.
Figure 11:
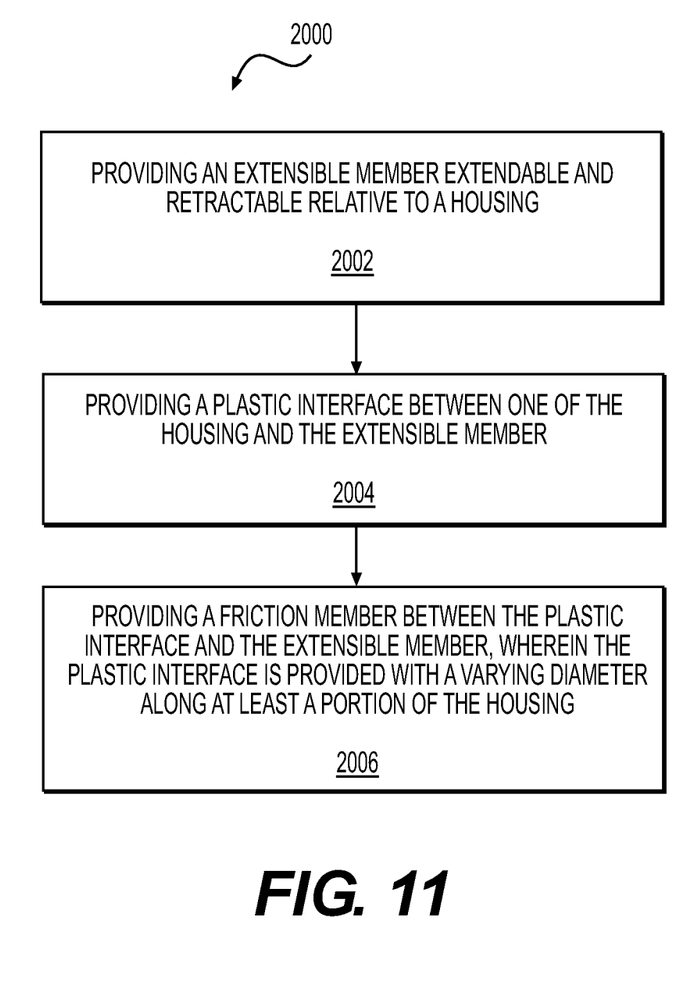

Now referring to FIGS. 10 and 11, there is illustratively provided a method 1000 of controlling movement of a closure panel 14 of a vehicle 10 between an open position and a closed position with a counterbalance mechanism 15 (e.g. strut). The method 1000 includes the step 1002 of setup of the rotational friction mechanism 46 and then the step 1004 of applying the rotating friction using the rotational friction mechanism 46. At step 1006, a variable sliding friction is applied using the sliding friction mechanism 15a. A further method 2000 is shown in FIG. 11. At step 2002, the counterbalance mechanism 15 is connected to the closure panel 14 and the body 11 of the vehicle 10. At step 2004, the shaped sleeve 112 is provided between the housing 41a and the extensible member 35, such that leaf spring(s) 102 at step 2006 are positioned (fixed axially on the axis 132) between the housing 41a and the shaped sleeve 112 and into contact with the shaped sleeve 112.

The method 1000 for operating the friction based counterbalance mechanism 15 of the closure panel 14 of the vehicle 10 assists in the opening and closing of the closure panel 14 by extending and retracting of the extension member 35 with respect to the housing 41a,41b along the axis 132. The method 1000, as discussed above, includes using the rotational friction mechanism 46 to provide rotating friction during the extending and retracting of the extension member 35; and using the sliding friction mechanism 15a to provide the sliding friction during the extending and retracting. Further, the extending and retracting of the extension member 35 along the axis 132 imparts a rotational motion about the axis 132 for operating the rotational friction mechanism 46 while at the same time imparts a linear motion along the axis 132 for operating the sliding friction mechanism 15a.

Further, the sliding friction mechanism 15a provides the sliding friction as a variable friction force during the extending and retracting of the extension member 35, while the rotational friction mechanism 46 provides the rotating friction as a constant friction force during the extending and retracting. As an example embodiment, the sliding friction mechanism 15a includes the resilient friction element 102 contacting the exterior friction surface 104 situated along the axis 132 and the rotational friction mechanism 46 includes the friction body 117 contacting an adjacent contact body 120, the friction body 117 rotating about the axis 132.

Figure 12:
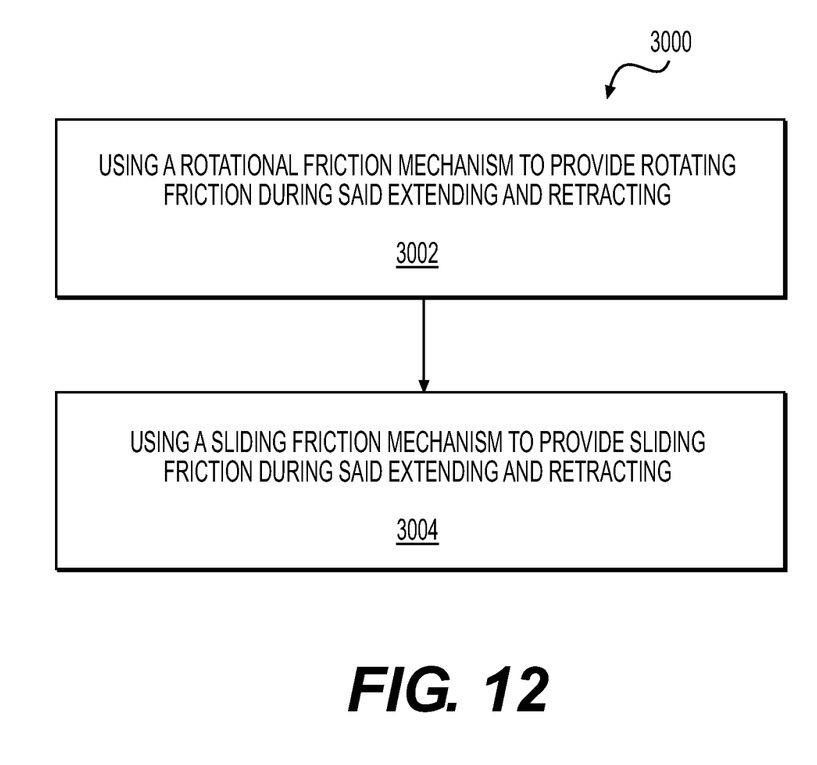
FIG. 12 is another example operation of the friction mechanisms of the counterbalance mechanism of FIGS. 1 through 9.

Now referring to FIG. 12, there is provided a method 3000 for operating a friction based counterbalance mechanism of a closure panel of a vehicle, the friction based counterbalance mechanism to assist in opening and closing of the closure panel by extending and retracting of an extension member with respect to a housing, the method 3000 including the steps of using a rotational friction mechanism to provide rotating friction during said extending and retracting 3002, and using a sliding friction mechanism to provide sliding friction during said extending and retracting 3004, wherein said extending and retracting of the extension member along the axis imparts a rotational motion about the axis for operating the rotational friction mechanism while at the same time imparts a linear motion along the axis for operating the sliding friction mechanism.

We claim:
1. A friction based counterbalance mechanism (15) for coupling with a closure panel (14) of a vehicle (10) to assist in opening and closing of the closure panel, the counterbalance mechanism including:
  a first housing (41a) having a first pivot connection mount (38) for connecting to one of a body (11) of the vehicle and the closure panel;
  an extension member (35) coupled to the first housing at one end (133) and being extendable and retractable with respect to a second housing (41b) coupled adjacent to the first housing, the second housing (41b) for connecting by a second pivot connection mount (36) to the other of the body and the closure panel;
  a sliding friction mechanism (15a) having:
  a shaped sleeve (112) mounted on one of the extension member and the second housing (41b), the shaped sleeve providing an exterior friction surface (104); and
  a resilient friction element (102) mounted to the other one of the second housing and the extension member, the resilient friction element positioned between second housing and the shaped sleeve and biased into contact with the exterior friction surface;
    wherein relative movement between the shaped sleeve and the resilient friction element as the extension member is displaced generates sliding friction between the resilient friction element and the shaped sleeve;
    wherein a diameter of the exterior friction surface is varied along a length of the shaped sleeve.

2. The friction based counterbalance mechanism of claim 1, wherein the shaped sleeve (112) is mounted on the extension member and the resilient friction element is mounted to the second housing, wherein the extension member is extendable and retractable along an axis (132), wherein the resilient friction element (102) is mounted to the second housing in a fixed location on the axis.

3. The friction based counterbalance mechanism of claim 1,
further comprising a rotational friction mechanism (46) mounted in the second housing including:
a lead screw (40) coupled to another end (130) of the extension member by a travel member (47) and connected at an opposite end (100) to a friction body (117), such that the friction body and the lead screw rotate conjointly with one another as the travel member is displaced along the lead screw, the travel member fixed to the another end;
a contact body (120) positioned on the axis adjacent to the friction body; and
a resilient element (128) positioned on the axis between the contact body and a mechanism housing (140) connected to the second housing, such that the resilient element exerts an axial force on the contact body to force the contact body against the friction body;
wherein relative rotational displacement between the friction body and the contact body during a rotation of the lead screw causes generation of rotating friction between the contact body and the friction body.

4. The friction based counterbalance mechanism of claim 3, wherein the relative movement between the shaped sleeve and the resilient friction element is caused as said travel member is displaced along the lead screw.

5. The friction based counterbalance mechanism of claim 3, further comprising the travel member threadingly engaged with the lead screw, the travel member connected to the extension member, such that said extension and retraction of the extension member with respect to the second housing causes translation of the travel member along the axis.

6. The friction based counterbalance mechanism of claim 2, further comprising a second resilient element (42) positioned between the first pivot connection mount and the second pivot connection mount and situated along the axis.

7. The friction based counterbalance mechanism of claim 1, wherein the shaped sleeve is composed of plastic and the resilient friction element is composed of metal.

8. The friction based counterbalance mechanism of claim 3, wherein one of the friction body and the contact body is composed of plastic and the other of the friction body and the contact body is composed of metal.

9. The friction based counterbalance mechanism of claim 3, wherein the sliding friction mechanism provides the sliding friction as a variable friction force while the rotational friction mechanism provides the rotating friction as a constant friction force during said rotation of the lead screw as the extension member is displaced.

10. The friction based counterbalance mechanism of claim 1, wherein said varied of the diameter is continuous along the length.

11. The friction based counterbalance mechanism of claim 1, wherein the diameter when the closure panel is in an open position is greater than the diameter when the closure panel is in a closed position.

12. The friction based counterbalance mechanism of claim 2, further comprising a spacer (108) and a retaining lip (109), the spacer and the retaining lip spaced apart along the axis, such that the resilient friction element is positioned between the spacer and the retaining lip for providing said fixed location on the axis.

13. The friction based counterbalance mechanism of claim 12, further comprising at least one retaining element (103) for connecting the resilient friction element to at least one of the spacer and the retaining lip, the retaining element inhibiting rotation of the resilient friction element about the axis during said as the extension member is displaced.

14. The friction based counterbalance mechanism of claim 1, further comprising an interference fit between the resilient friction element and the exterior friction surface.

15. The friction based counterbalance mechanism of claim 1, wherein the resilient friction element is a plurality of resilient friction elements.

16. The friction based counterbalance mechanism of claim 1, wherein shaped sleeve is composed of an overmold material formed on the exterior surface of the extension member.

17. A method for operating a friction based counterbalance mechanism (15) of a closure panel (14) of a vehicle (10), the friction based counterbalance mechanism to assist in opening and closing of the closure panel by extending and retracting of an extension member (35) with respect to a second housing along an axis (132), the method comprising the steps of:
connecting a first pivot connection mount (38) of a first housing to one of a body of the vehicle and the closure panel, such that the extension member is coupled to the first housing, the second housing coupled adjacent to the first housing, the second housing for connecting by a second pivot connection mount to the other of the body and the closure panel;
using a rotational friction mechanism (46) having a resilient friction element to provide rotating friction during said extending and retracting; and
using a sliding friction mechanism (15a) having a shaped sleeve mounted on one of the extension member and the second housing, the shaped sleeve providing an exterior friction surface, and a second resilient friction element to provide sliding friction with the shaped sleeve during said extending and retracting, a diameter of the exterior friction surface being varied along a length of the shaped sleeve;
wherein said extending and retracting of the extension member along the axis imparts a rotational motion about the axis for operating the rotational friction mechanism while at the same time imparts a linear motion along the axis for operating the sliding friction mechanism.

18. The method of claim 17, wherein the sliding friction mechanism provides the sliding friction as a variable friction force during said extending and retracting, while the rotational friction mechanism provides the rotating friction as a constant friction force during said extending and retracting.

19. The method of claim 17, wherein the sliding friction mechanism includes the second resilient friction element contacting the exterior friction surface situated along the axis and the rotational friction mechanism includes a friction body contacting an adjacent contact body, the friction body rotating about the axis.

20. A counterbalance mechanism (15) of a closure panel (14) of a vehicle (10), the counterbalance mechanism comprising an extension member (35) to extend and retract with respect to a second housing during opening and closing of the closure panel, the counterbalance mechanism (15) comprising:

a first housing having a first pivot connection mount for connecting to one of a body of the vehicle and the closure panel, such that the extension member is coupled to the first housing;

the second housing coupled adjacent to the first housing, the second housing for connecting by a second pivot connection mount to the other of the body and the closure panel;

a rotational friction mechanism (46) having a resilient friction element to provide rotating friction during said extending and retracting; and a sliding friction mechanism (15*a*) having a shaped sleeve mounted on one of the extension member and the second housing, the shaped sleeve providing an exterior friction surface, and a second resilient friction element to provide sliding friction with the shaped sleeve during said extending and retracting, a diameter of the exterior friction surface being varied along a length of the shaped sleeve;

wherein said extending and retracting of the extension member imparts a rotational motion for operating the rotational friction mechanism to generate the rotating friction while at the same time imparts a linear motion for operating the sliding friction mechanism to generate the sliding friction, wherein the rotating friction and the sliding friction act to resist the opening and closing of the closure panel.

\* \* \* \* \*